Aug. 14, 1956  D. D. JOHNSON  2,758,646
DOOR STRUCTURE
Filed Dec. 4, 1952
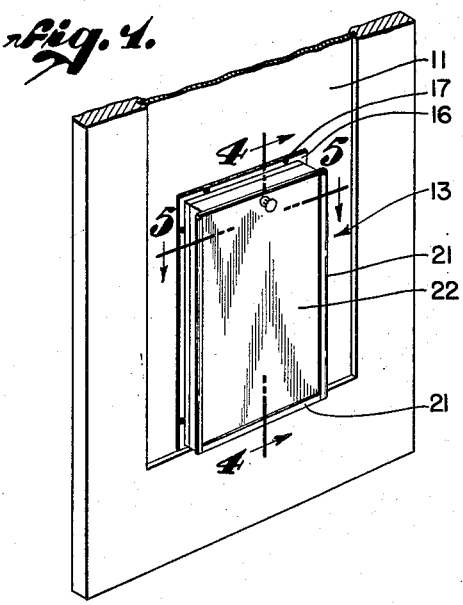
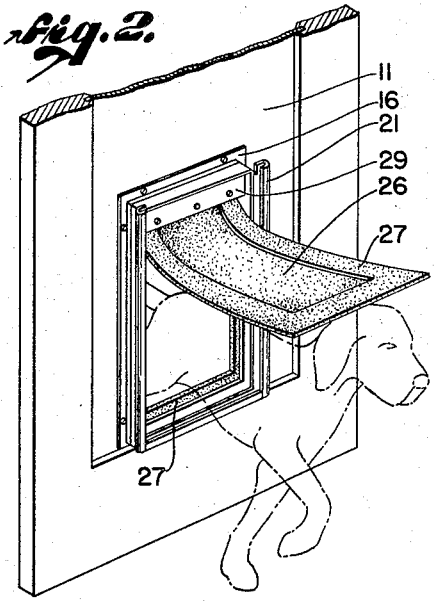
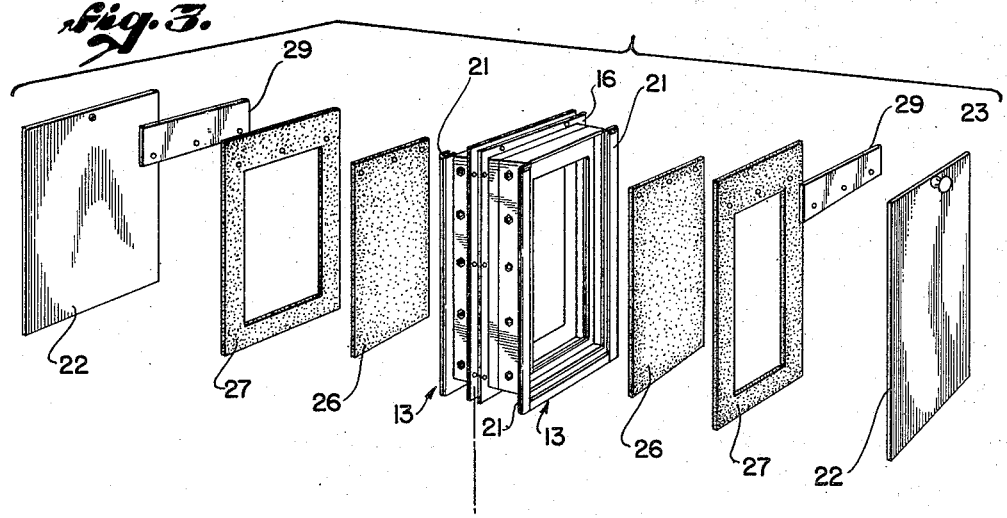
DON D. JOHNSON,
INVENTOR.
HUEBNER, BEEHLER,
WORREL & HERZIG.
ATTORNEYS.
BY Warren T. Jessup Aug. 14, 1956     D. D. JOHNSON     2,758,646
DOOR STRUCTURE
Filed Dec. 4, 1952     2 Sheets-Sheet 2
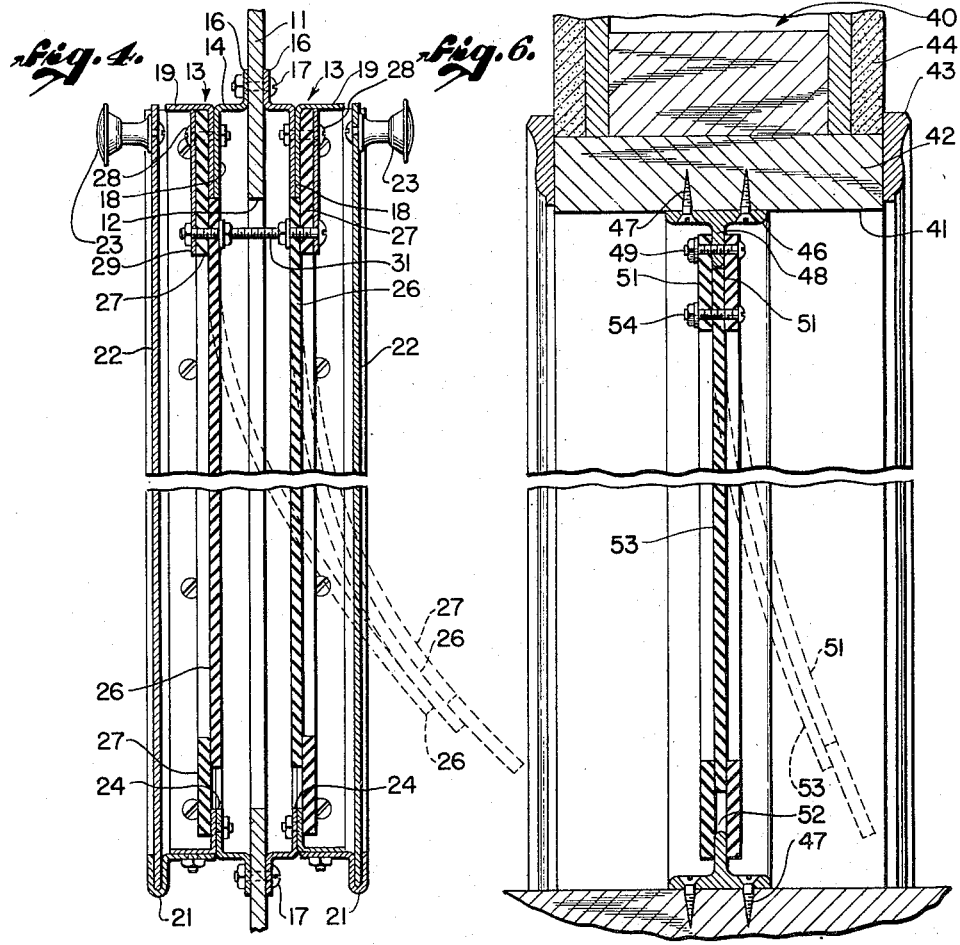
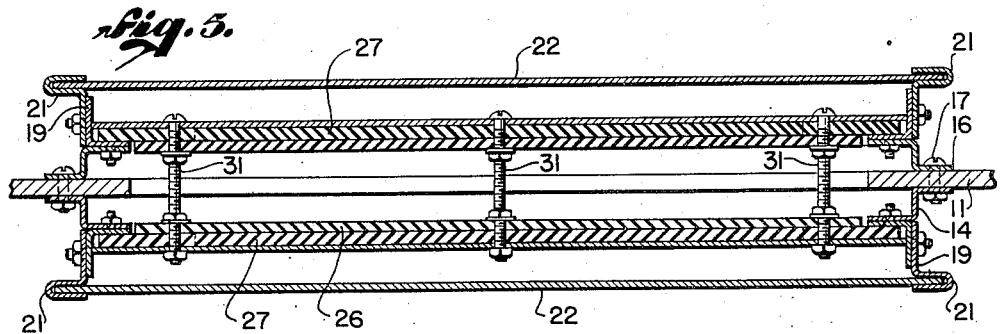
DON D. JOHNSON,
*INVENTOR.*
HUEBNER, BEEHLER,
WORREL & HERZIG.
*ATTORNEYS.*
BY Warren T. Jessup United States Patent Office 2,758,646
Patented Aug. 14, 1956

2,758,646
DOOR STRUCTURE
Don D. Johnson, Laguna Beach, Calif.
Application December 4, 1952, Serial No. 324,001
6 Claims. (Cl. 160—354)

This invention relates to a door structure particularly adapted for the passage of small animals, such as dogs and cats.

It is an object of this invention to provide a pet door capable of keeping out the elements while still permitting the passage of small animals therethrough without human assistance.

It is another object of this invention to provide a pet door capable of being operated without help by the animal, which has improved means for keeping out the elements, such as drafts and rain.

It is a further object of this invention to provide a pet door structure having improved means for closing the crack between the door and the door frame.

In accordance with these objects and with other objects which will become apparent hereinafter, preferred embodiments of the instant invention will now be described with reference to the accompanying drawings wherein:

Fig. 1 is a perspective view of a preferred form of the instant invention;

Fig. 2 is a similar view showing the door in operation as a dog passes therethrough;

Fig. 3 is an exploded perspective view showing the elements comprising the door structure of Figs. 1 and 2;

Fig. 4 is a vertical section taken on line 4—4 of Fig. 1;

Fig. 5 is a horizontal section taken on line 5—5 of Fig. 1; and

Fig. 6 is a vertical section generally similar to Fig. 4, showing another embodiment of the present invention.

Referring to the drawings, 11 designates any wall or barrier, which may be either a solid wall in a building, or may be a personnel door closing a doorway in the building. In the particular case shown, 11 designates a relatively thin walled personnel door.

In the door 11, preferably spaced from the bottom thereof, is an aperture 12 (Fig. 4) forming an archway or passageway. Secured to the door 11 at each side of the aperture 12 are a pair of substantially identical closures 13. Each closure comprises a substantially rectangular frame 14 having a rectangular aperture therethrough. The frame 14 includes an outwardly extending flange 16 therearound, which is secured to the barrier 11 circumjacent the aperture 12 by means of bolt-and-nut connections 17. As is seen in Fig. 4, if the barrier 11 is thin enough, the same securement 17 may be used for both of the door structures 13. If the barrier is thick, as would be the case in a normal stud and plaster wall of a house, it would be desirable to use separate securements 17 on each side of the barrier.

The frame 14 also has an inwardly extending flange 18 to which is secured the corresponding flange of an extension member 19. Around the two sides and bottom of the extension 19 is placed a channel or groove member 21, and in the channel thereof there is slidably mounted a solid panel or door 22 preferably made of metal, as are the other parts of the frame. The door 22 has a knob 23 by means of which it may be removed from the closure 13 by being slid upwardly in the groove member 21.

Disposed within, and substantially filling, the archway or aperture 24 in the closure 13, is a flap or door 26. The door 26 is secured at its upper edge to the closure 13 in a manner which will be described hereinafter. The two sides and bottom of the door 26 are left unsecured. The mounting of the door 26 to the door frame in accordance with the instant invention, is effected so that the door may be swung back and forth about its upper edge mounting. In the present invention this is preferably effected by making the door of flexible material. In this case the material is a substantially homogeneous sheet of flexible material, such as a sheet or slab of thick rubber, natural or synthetic. Flexible plastic material may also obviously be used.

Secured to the closure 13 along the upper edge thereof is a flat border or open frame member 27. Like the door 26, the border 27 is free to swing outwardly except along its upper edge. Also, like the door 26, this is preferably effected by making the border 27 of a flexible material such as a sheet of heavy rubber, or flexible plastic. The ring is of such dimensions and so disposed that it overlies the crack between the door 26 and the frame 14, in the archway or aperture 24 of which is disposed the door 26. This serves to block the passage of drafts, and in general keeps the door aperture 12 closed.

The border 27 is placed against the face of the extension 19, and the upper portion or edge of the border 27 is secured thereto by a series of bolt-and-nut connections 28, which also serve to hold the extension 19 to the frame 14 proper. On the outer face of the border 27 is placed a plate 29 serving as a washer means through which the bolt 28 also passes. The rubber door 26 is secured to the frame 14 through the intermediacy of the upper run of the border 27. This securement in the embodiment shown in Fig. 4 assumes the form of a long bolt 31, which may be also used for the corresponding securement in the opposite door or flap 26, as shown in Fig. 4.

When the door is in use, to allow free passage of a dog or cat through the aperture or archway 12, the solid sliding doors 22 are both removed and placed to one side. To pass through the aperture, the animal steps through the ring 27 which faces him, e. g., the left-hand ring in Fig. 4, and with his head he pushes aside or upwardly a door 26 which faces him. The first door 26 comes into engagement with the second door 26 which is already in engagement with its corresponding border 27, so that all three members are pushed aside upwardly as shown in the dotted lines in Fig. 4. The pet thus is enabled to pass through the barrier 11 substantially as shown in Fig. 2. When the animal's body has completely cleared the aperture, the three members drop back into position by virtue of their weight and natural resiliency. They then resume the position shown in Figs. 4 and 5.

From the above it will be seen that the aperture 12 may be readily negotiated by an animal after a slight amount of training, while the aperture is well closed when not in use by virtue of the overlying borders 27 which cover the crack between the door 26 and the frame 14.

Another form of the invention is shown in Fig. 6, applied to an aperture 41 formed in a typical house wall 40. Around the aperture 41 is constructed a frame 42. Ornamental molding 43 may be used to cover the joint between the frame 42 and the plaster 44 if desired.

The frame 42 is made of proper size to just accommodate a door frame 46, which may be secured within the frame 42 by means of screws 47. Extending inwardly around the frame 46, which is preferably rectangular, is a flange 48. To the upper run of the flange 48 on opposite sides thereof are secured by means of bolt-and-nut connections 49, a pair of rubber borders or open frame members 51. Within, and substantially closing, the aperture 52 formed by the flange 48, is a rubber door 53, the upper edge of which is disposed between the lower portions of the upper runs of the borders 51. The upper edge of the door 53 is secured to the two borders 51 by a series of bolt-and-nut connections 54.

Use of the device of Fig. 6 is the same as that described in connection with the first embodiment. Assume, for example, that the animal wishes to pass from right to left through the frame 42. The animal pushes with his head against the rubber door 53, causing it to swing aside upwardly and pushing ahead of it the right-hand border 51. He then steps through the left-hand border 51, and under or to one side of the door 53, thereupon emerging on the right-hand side of the wall 40.

Since both of the borders 51 are secured against the opposite sides of the same flange 48, only one door 53 is required instead of the two doors 26 required in the case of the first embodiment.

As readily seen in Figure 6, both of the borders 51 close the same crack around the door 53, thereby providing a double block against passage of drafts. It will be clear that only one border may be employed if drafts are not severe enough to require the double blockade.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims.

What is claimed is:

1. A door structure comprising frame means having a passageway therethrough, door means swingably mounted on said frame means adjacent the upper edge of said passageway for swinging movement in either direction therethrough, open border means swingably mounted on said frame means adjacent the upper edge of said passageway and arranged to engage and cover adjacent edge portions of said door means and passageway on one side of said door means when said door means and border means are in closed position, said door means and said border means being independently swingable on said frame means.

2. A door structure as defined in claim 1 wherein said door means and border means are each biased to closed position.

3. A door structure as defined in claim 1 wherein said door means is made of flexible and resilient substantially homogeneous material secured adjacent its upper edge to said frame means.

4. A door structure as defined in claim 1 wherein said border means is made of flexible and resilient substantially homogeneous material secured adjacent its upper edge to said frame means.

5. A door structure as defined in claim 1 wherein a second border means are swingably mounted on said frame, similarly to said first-named border means but on the other side of said door.

6. A door structure as defined in claim 1 including means defining guide channels on said frame outwardly of said border means, and a solid door slidably mounted in said channels.

References Cited in the file of this patent
UNITED STATES PATENTS

| | | |
|---|---|---|
| 922,069 | Walsh | May 18, 1909 |
| 1,179,246 | Warburton | Apr. 11, 1916 |
| 2,122,532 | Mims | July 5, 1938 |
| 2,560,661 | Poovey | July 17, 1951 |
| 2,633,826 | Hansen | Apr. 7, 1953 |
| 2,699,826 | Emerson | Jan. 18, 1955 |